United States Patent

Thames

[11] Patent Number: 5,954,144
[45] Date of Patent: Sep. 21, 1999

[54] VARIABLE-SPEED, MULTIPLE-DRIVE POWER TOOL

[75] Inventor: Bruce A. Thames, Cypress, Tex.

[73] Assignee: Intool Incorporated, Houston, Tex.

[21] Appl. No.: 08/490,207

[22] Filed: Jun. 14, 1995

[51] Int. Cl.⁶ .......................... B23Q 5/10; B25B 23/143
[52] U.S. Cl. .......................................... 173/216; 173/217
[58] Field of Search .................................. 173/216, 217, 173/93, 93.5, 176

[56] References Cited

U.S. PATENT DOCUMENTS

| | | | |
|---|---|---|---|
| 3,116,617 | 1/1964 | Skoog | 64/26 |
| 3,373,824 | 3/1968 | Whitehouse | 173/12 |
| 3,472,081 | 10/1969 | Keller et al. | 74/48 |
| 3,556,230 | 1/1971 | Rogenburk | 172/93.5 |
| 3,586,115 | 6/1971 | Amtsberg | 173/163 |
| 3,610,343 | 10/1971 | Bratt | 173/12 |
| 3,696,871 | 10/1972 | Stenbacka | 173/12 |
| 3,739,659 | 6/1973 | Workman, Jr. | 74/751 |
| 3,809,179 | 5/1974 | Delaney, Jr. et al. | 181/36 |
| 3,827,510 | 8/1974 | Mazepa | 173/217 |
| 3,871,138 | 3/1975 | Welsch | 51/170 |
| 4,120,604 | 10/1978 | Garofalo | 415/25 |
| 4,147,219 | 4/1979 | Wallace | 173/12 |
| 4,155,278 | 5/1979 | Estok | 81/57.11 |
| 4,266,444 | 5/1981 | Anderson et al. | 74/661 |
| 4,300,641 | 11/1981 | Kinkel | 173/12 |
| 4,307,784 | 12/1981 | Smith | 173/12 |
| 4,359,107 | 11/1982 | Smith | 173/12 |
| 4,434,858 | 3/1984 | Whitehouse | 173/12 |
| 4,462,282 | 7/1984 | Biek | 81/57.11 |
| 4,484,871 | 11/1984 | Adman et al. | 418/69 |
| 4,522,269 | 6/1985 | Adman et al. | 173/12 |
| 4,553,948 | 11/1985 | Tatsuno | 464/25 |
| 4,766,787 | 8/1988 | Sugimoto et al. | 81/463 |
| 4,789,373 | 12/1988 | Adman | 464/25 |
| 4,836,296 | 6/1989 | Biek | 173/93.5 |
| 4,844,177 | 7/1989 | Robinson et al. | 173/12 |
| 4,869,139 | 9/1989 | Gotman | 81/475 |
| 4,880,064 | 11/1989 | Willoughby et al. | 173/12 |
| 4,898,249 | 2/1990 | Ohmori | 173/217 |
| 4,991,473 | 2/1991 | Gotman | 81/475 |
| 5,080,181 | 1/1992 | Tatsuno | 173/93.5 |
| 5,092,410 | 3/1992 | Wallace et al. | 173/93.5 |
| 5,178,046 | 1/1993 | Matsumoto et al. | 173/216 |
| 5,181,575 | 1/1993 | Maruyama et al. | 173/180 |
| 5,203,242 | 4/1993 | Hansson | 81/469 |

OTHER PUBLICATIONS

*Atlas Copco* 1987 Catalog, "Industrial Power Tools" (five pages).
*Cleco* 1993 Catalog, "Cleco Air Tools" (four pages).
*Ingersoll–Rand* 1989 Catalog (four pages).

*Primary Examiner*—Scott A. Smith
*Attorney, Agent, or Firm*—Baker & Botts, L.L.P.

[57] ABSTRACT

A variable-speed, multiple-drive, power tool (10) is driven by first motor (18) having a first longitudinal axis (32) and second motor (20) having a second longitudinal axis (100). Second motor (20) drives ring gear (52) of first planetary gear set (48) while first motor (18) drives pinion (36). First end (40) of pinion (36) serves as sun gear (46) for first planetary gear set (48). First planetary gear set (48) drives intermediate spindle (76). Intermediate spindle (76) in turn drives second planetary gear set (82). Second planetary gear set (82) drives output spindle (22) through gear element (90).

18 Claims, 2 Drawing Sheets

VARIABLE-SPEED, MULTIPLE-DRIVE POWER TOOL

TECHNICAL FIELD OF THE INVENTION

This invention relates in general to the field of power tools, and more particularly to a variable-speed, multiple-drive power tool.

BACKGROUND OF THE INVENTION

Power tools such as nut runners, drills, grinders, sanders or similar type tools frequently provide a rotating shaft at a given speed and torque. Depending on the function being performed, it is often advantageous to provide a rotating shaft at variable speeds and variable torques. The speed and torque of a rotating shaft may be altered through the use of gears and motors. For example, when using a power tool to rotate a fastener, it is often desirable to rotate the fastener at a high rate of speed throughout the fastening process until the fastener is almost tightened or meeting with additional resistance. During final tightening or increased resistance, it is often advantageous to apply a low speed rotation with a higher torque. The speed and torque of the output shaft of a power tool may be altered by engaging and disengaging various gears.

Disadvantages of known power tools providing a rotating shaft may include the use of motors that are restricted to air or pneumatic motors only. Some types of power tools may only provide output torques at discrete or pre-defined output torque levels. Other disadvantages include the use of motors requiring extensive maintenance and lubrication. Still other disadvantages may include inadvertent shifting from high speed/low torque output to a low speed/high torque output rotation before such a shift is desired. Additionally, some devices may require the use of relatively long, torque transmitting shafts for transmitting rotational motion through a relatively long, hollow shaft which may create numerous disadvantages. A disadvantage of such arrangements is that more material may be required thus adding increased weight and cost to the power tool. Finally, some devices do not allow for the adjustment of gear ratios to pre-select or adjust the desired output speed and torque of the output shaft.

SUMMARY OF THE INVENTION

In accordance with the present invention, the disadvantages and problems associated with the previous techniques and devices used for supplying an output shaft or spindle with a variable speed and torque have been substantially reduced or eliminated by the present invention. One aspect of the present invention provides a compact, variable-speed, multiple-drive power tool that provides a high speed/low torque output that may be continuously changed or varied until a low speed/high torque output condition is obtained in response to a resistive torque applied to the output shaft or spindle.

In accordance with another aspect of the invention, a variable-speed, multiple-drive power tool is provided that may include two motors for driving the power tool. The motors are positioned such that the longitudinal axis of each motor's output shaft or spindle is displaced from one another. The motors initially rotate simultaneously and drive a planetary gear set which may directly or indirectly drive the output shaft or spindle.

In accordance with another aspect of the invention, a variable-speed, multiple-drive power tool may include two motors in which the output of one motor serves as the sun gear of a planetary gear set. The other motor may drive the ring gear of the planetary gear set. Both motors may operate concurrently and the motor directly driving the ring gear primarily serves to produce a high speed/low torque condition at the output shaft or spindle.

In accordance with yet another aspect of the invention, a motor drives the ring gear of a planetary gear set through a geared coupling. The gear ratio of this geared coupling may be varied or adjusted to produce the desired output speed and torque of the output shaft or spindle.

Technical advantages of the present invention include allowing the use of multiple motors in place of one large motor thus allowing the use of small oil-free motors. Another technical advantage includes the ability to use multiple motors positioned so that relatively long shafts for transmitting rotational motion are not needed; this may allow for decreased material costs and an overall weight reduction of the power tool. Additionally, the axial length of the power tool can be shorter thus providing a more versatile tool that may be used in smaller areas. Still another technical advantage may include the use of different types of motors, including rotary vane motors, to perform specific functions in the power tool thus providing enhanced performance. Yet another technical advantage may include the flexibility to position the motors so that a power tool incorporating the present invention may be packaged in a pistol-grip housing. Finally, additional technical advantages of the present invention may include increased responsiveness to applied torques because distinct or discrete changes are not made between high speed/low torque output conditions to low speed/high torque output conditions, but instead, gear ratios are varied to provide a smooth or gentle transition from one output condition to another.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1:
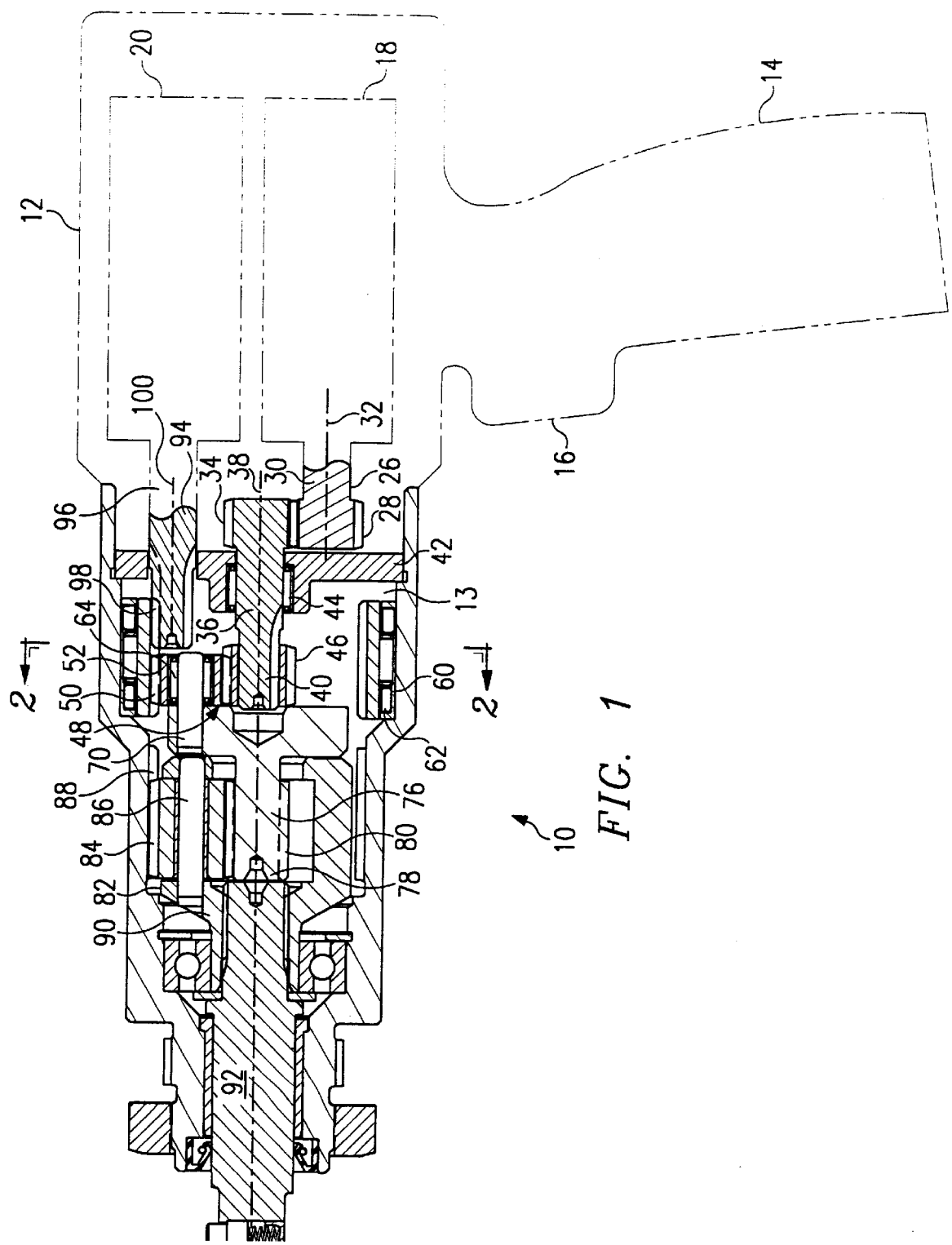
FIG. 1 is a cross-sectional view, with portions broken away, of a variable-speed, multiple-drive power tool according to one aspect of the present invention.
Figure 2:
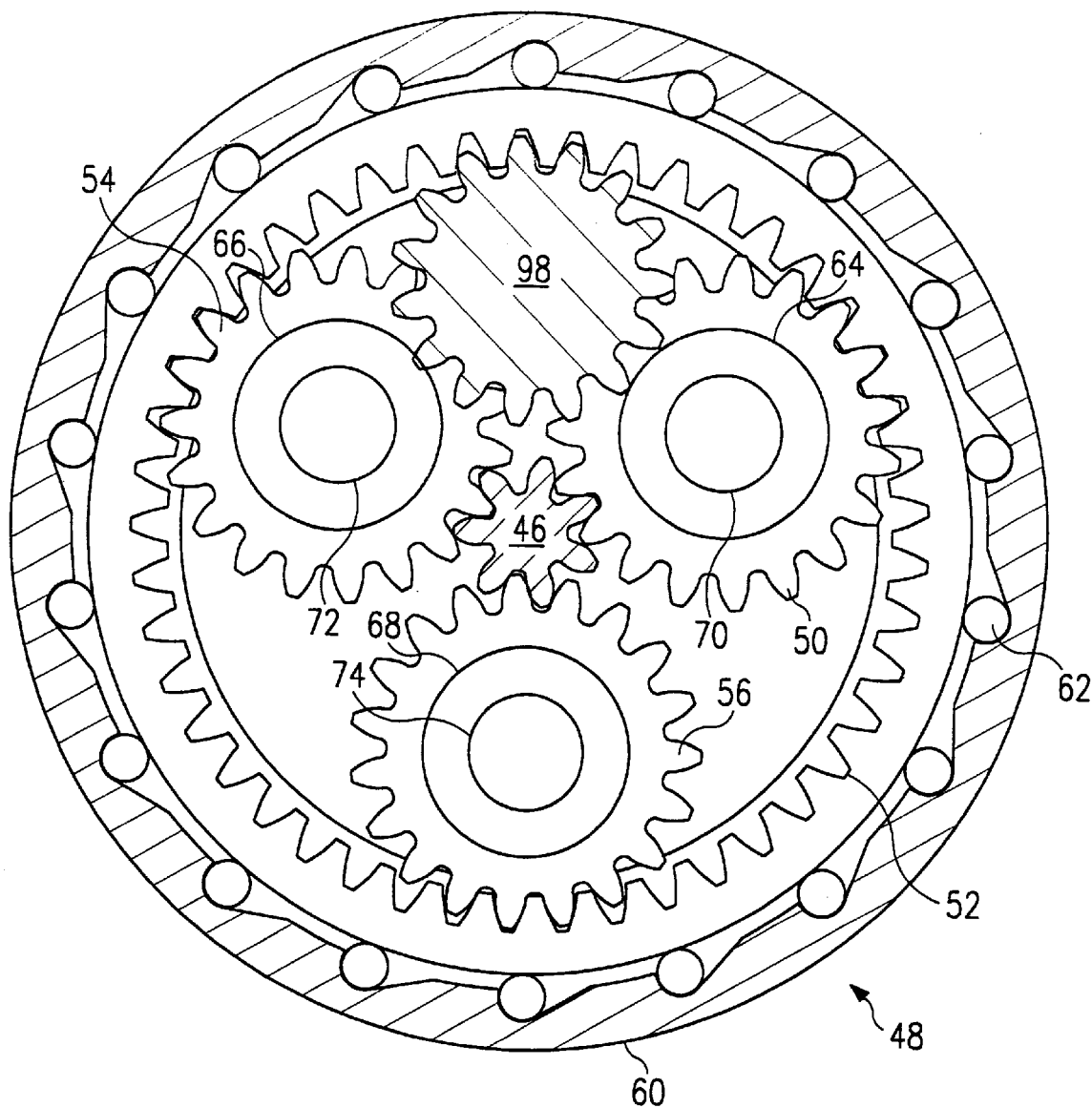
FIG. 2 is a cross-sectional view of the variable-speed, multiple-drive power tool of FIG. 1 taken along line 2—2 in FIG. 1.

The present invention and its advantages are best understood by referring to FIGS. 1–2 of the drawings, like numerals being used for like and corresponding parts of the various drawings. For illustrative purposes, the description of the invention is presented in the context a power tool for the complying fasteners, but it should be understood that the invention described herein is applicable to other power tools as well. The invention may be incorporated within any number of power tools such as the power tools described in U.S. Pat. No. 4,462,282, entitled "Power Tool With Torque Reaction Bar" which is incorporated herein by reference for all purposes.

Referring now to FIG. 1 of a variable-speed, multiple-drive power tool 10 has a housing 12 with a cavity 13 and a handle 14 for gripping the tool. Trigger or throttle 16 controls the activation of variable-speed, multiple-drive power tool 10 and is located on handle 14 for ease of use. The cavity 13 of housing 12 contains first motor 18 and second motor 20 for driving a system of gears to ultimately rotate output spindle 22. Output spindle 22 includes tool attachment mechanism 24 for attaching an external tool such as a socket that may be rotated by output spindle 22 to perform some useful function such as securing a mechanical fastener. Various types of motors, including turbine motors and rotary vane motors, may be satisfactorily used as first motor 18 and second motor 20 depending upon the intended application for power tool 10.

The embodiment of the invention shown in FIG. 1 uses both first motor 18 and second motor 20 to drive variable-speed, multiple-drive power tool 10. First motor 18 and second motor 20 operate concurrently to drive variable-speed, multiple-drive power tool 10 during a portion of its operation. For some applications, second motor 20 may be a rotary vane motor.

First motor 18 has a first output drive shaft 26 with first gear 28 coupled to first end 30 of first output drive shaft 26. First output drive shaft 26 of first motor 18 has a first longitudinal axis 32, which may be located by the centroidal method over by using symmetry. For the embodiment shown, first motor 18 rotates first output drive shaft 26 in a counterclockwise direction (hereinafter, clockwise and counterclockwise are defined for the orientation of looking in the direction defined by the arrows of line 2—2 in FIG. 1). The counterclockwise rotation of first output drive shaft 26 accordingly rotates first gear 28 also in the counterclockwise direction. First gear 28 couples to second gear 34 such that the counterclockwise rotation of first gear 28 rotates second gear 34 in a clockwise direction.

Second gear 34 directly couples to pinion 36. Pinion 36 has second end 38 and first end 40. Second gear 34 couples to pinion 36 at second end 38. Pinion 36 rotates within power tool 10 while being supported by first end plate 42 and bearing 44. Bearing 44 allows pinion 36 to rotate within housing 12. First end 40 of pinion 36 couples to sun gear 46 and thus the clockwise rotation of pinion 36 rotates sun gear 46 in a clockwise direction.

As shown in FIGS. 1 and 2, a planetary gear set 48 of the type known in the art may be utilized with the present invention. First planetary gear set 48 contains sun gear 46, idler gears, with first idler gear 50 shown in FIG. 1, ring gear 52, and one-way clutch 60. The clockwise rotation of sun gear 46 by pinion 36 rotatably engages idler gears with first idler gear 50 shown engaged with sun gear 46 in FIG. 1. The idler gears rotatably engage ring gear 52. One-way clutch 60, including a one-way clutch bearing 62, allows ring gear 52 to rotate in a clockwise direction and prevents ring gear 52 from rotating in a counterclockwise direction. First needle bearing 64 of first idler gear 50 allows first idler gear 50 to rotate around first idler gear pin 70 in a counterclockwise direction. The idler gear pins, with first idler gear pin 70 shown in FIG. 1, move in a circular path concentric with ring gear 52.

The idler gears of planetary gear set 48 couple to intermediate spindle 76 so that intermediate spindle 76 is rotated in a clockwise direction within housing 12. Second end 78 of intermediate spindle 76 serves as sun gear 80 of second planetary gear set 82. Second planetary gear set 82 operates similarly to first planetary gear set 48. Sun gear 80 of second planetary gear set 82 couples to idler gears, with idler gear 84 shown in FIG. 1. The clockwise rotation of sun gear 80 of second planetary gear set 82 rotatably engages the idler gears with idler gear 84 shown engaged with sun gear 80 in FIG. 1. Idler gear 84 also is driveably engaged with ring gear 88 of second planetary gear set 82 such that idler gear 84, having idler gear pin 86, may move in a circular path concentric with ring gear 88.

Idler gear 84 may simultaneously rotate around idler gear pin 86 in a counterclockwise direction. The idler gear pins of second planetary gear set 82, with idler gear pin 86 shown in FIG. 1, engage gear element 90 to directly drive output spindle 22 in a clockwise direction at the desired speed and torque. Output spindle 22 engages gear element 90 at first end 92 of output spindle 22. Output spindle 22 rotates within housing 12 to provide the desired output speed and torque. Additional gears may be included with the present invention to achieve a desired gear ratio.

Second motor 20 provides a second output drive shaft 94 and rotates second output drive shaft 94 in a clockwise direction. Second output drive shaft 94 of second motor 20 has a second longitudinal axis 100, which may be located by the centroidal method by using symmetry. Third gear 98 of first end 96 of second output drive shaft 94 driveably engages ring gear 52 of first planetary gear set 48. The clockwise rotation of second output drive shaft 94 drives ring gear 52 in a clockwise direction. The gear ratio between third gear 98 and ring gear 52 may be varied to ultimately provide different output operating characteristics. Second output drive shaft 94 passes through first end plate 42 as shown in FIG. 1.

Ring gear 52 remain rotatably engaged to the idler gears, with first idler gear 50 shown in FIG. 1. FIG. 2, discussed more below, details the engagement between ring gear 52 and first idler gear 50, second idler gear 54 and third idler gear 56. Third gear 98 drives ring gear 52 in a clockwise direction. Ring gear 52, engaged with idler gears, with first idler gear 50 shown in FIG. 1, correspondingly assists in driving the idler gear pins in a circular path concentric with ring gear 52. As discussed above, the idler gears of planetary gear set 48 coupled to intermediate spindle 76 which ultimately provides rotational motion to output spindle 22 at a desired output speed and torque.

FIG. 2 illustrates first planetary gear set 48 having one-way clutch 60 and ring gear 52. One-way clutch 60 having one-way clutch bearing 62 allows ring gear 52 to rotate only in the clockwise direction. Third gear 98 driveably engages ring gear 52 and may rotate ring gear 52 in a clockwise direction. Sun gear 46, which rotates in a clockwise direction, driveably engages first idler gear 50, second idler gear 54, and third idler gear 56. First idler 50, second idler gear 54, and third idler gear 56 also engage ring gear 52.

For some applications, one-way clutch 60 could be provided as part of second output drive shaft 94, located between second motor 20 and ring gear 52. This configuration (not shown) would allow the use of a smaller one-way clutch as compared to clutch 60 shown in FIG. 2. The overall size of he resulting power tool may also be reduced.

The idler gears shown in FIG. 2 each have needle bearings, e.g., bearing 64, which allow each idler gear to rotate around an idler gear pin. Specifically, first idler gear 50 may rotate around first idler gear pin 70 through first needle bearing 64. Second idler gear 54 may rotate around second idler gear pin 72 through second needle bearing 66, and third idler gear 56 may rotate around third idler gear pin 74 through third needle bearing 68.

In operation, sun gear 46, driven by first motor 18, rotates in a clockwise direction while driveably engaged to first idler gear 50, second idler gear 54, and third idler gear 56. Idler gears 50, 54, and 56 rotate in a counterclockwise direction relative to their respective idler gear pins. Idler gears 50, 54, and 56 may not drive ring gear 52 in a counterclockwise direction because one-way clutch 60 prevents such rotation. Third gear 98 rotates in a clockwise direction and correspondingly rotates ring gear 52 in a clockwise direction. Idler gear pins 70, 72 and 74 move in a clockwise direction, concentric with ring gear 52. This movement of idler gear pins 70, 72 and 74 provide clockwise rotation to intermediate spindle 76 which ultimately provides rotational motion that drives output spindle 22 at the desired output speed and torque.

In its environment, power tool 10 may be used to provide output rotational motion at a variable speed and torque. For example, power tool 10 may be used as a nut runner for applying fasteners by initially rotating the fasteners at a relatively high speed/low torque until the torque increases sufficiently. As the fastener meets resistance, the torque requirements increase. Accordingly, power tool 10 provides the needed output torque by providing a relative low speed/ high torque rotation so that proper tightening may be achieved. This may be accomplished by the embodiment of the variable-speed, multiple-drive, power tool 10 shown in FIG. 1.

First motor 18 and second motor 20 operate concurrently to initially drive output spindle 22 at a relative high speed/ low torque—to run the fastener down. As more resistance to the rotation of output spindle 22 is experienced, more torque may be required to rotate the fastener or perform some other function. The resistance on output spindle 22 forces second motor 20 to slow. As second motor 20 slows, a proportional increase in gear reduction results thereby increasing the torque at the output spindle. As second motor 20 continues to decrease in speed, the overall gear reduction continues to increase until second motor 20 stalls. First motor 18 continues to operate. First motor 18 delivers the final output torque through the maximum gear ratio before stalling.

First motor 18 and second motor 20 may be air driven motors, rotary vane motors, hydraulic motors, electric motors or any other similar type motors. First motor 18 may be a low speed rotary vane motor and second motor 20 may be an air turbine motor providing high speed/low torque output.

The embodiment of the present invention shown in FIGS. 1 and 2 includes first planetary gear set 48 and second planetary gear set 82. These planetary gear sets include idler gears. First planetary gear set 48 is illustrated in FIG. 2 as having three idler gears. The number of idler gears should not be limited to only three idler gears and may contain any other number of idler gears. The gear system may also be used.

An aspect of the present invention includes the use of multiple motors instead of using one large motor. As demonstrated in the one embodiment of the present invention shown in FIGS. 1 and 2, first motor 18 and second motor 20 may be small enough to be operated as oil-free motors. This may increase reliability and decreased maintenance.

Another aspect of the present invention includes the ability to use multiple-motors positioned on different longitudinal axis. This may decrease packaging size and decrease material costs. For example, housing 12 may be formed to generally define a pistol-grip shaped housing which allows for one-handed operation. This may also provide for a more compact power tool having a shorter axial length which provides the advantage of greater versatility while working in smaller areas.

The present invention uses multiple motors for specific functions. This allows for the use of different types of motors specifically designed to serve particular functions. For example, first motor 18 ultimately provides low speed/high torque output. A low speed rotary vane motor may be used to serve this function with the advantage of greatly reduced centrifugal forces and pressure-velocity values of the vanes against the cylinder wall. The use of multiple motors also provides the technical advantage of increased responsiveness to applied torques because distinct or incremental changes are not made between high speed/low torque output conditions to low speed/high torque output conditions. Instead, gear ratios are varied to provide a smooth or general transition from one output condition to another.

The present invention also provides the flexibility to adjust the gear ratio between the ring gear and the gear driving the ring gear. For example, in the embodiment of the present invention illustrated in FIG. 1, second motor 20 contains third gear 98 coupled to first end 96 of second output drive shaft 94. Third gear 98 directly drives ring gear 52. The gear ratio between third gear 98 and ring gear 52 may be varied by varying the size of third gear 98 or its gear arrangement.

Although the present invention and its advantages have been described in detail, it should be understood that various changes, substitutions and alterations can be made therein without departing from the spirit and scope of the invention as defined by the appended claims.

What is claimed is:

1. A variable-speed, multiple-drive power tool, for providing output rotation at a desired speed and torque such that the output may vary over a range from a relative high speed/low torque output condition to a relative low speed/ high torque output condition, the power tool comprising:

a housing having a cavity formed therein;

a first motor secured within the cavity of the housing;

a first output drive shaft coupled to the first motor and the first output drive shaft defining a first longitudinal axis and having a first end;

a second motor secured within the cavity of the housing;

a second output drive shaft coupled to the second motor and the second output drive shaft defining a second longitudinal axis and having a first end, the first longitudinal axis of the first output drive shaft and the second longitudinal axis of the second output drive shaft being displaced from one another;

a planetary gear set having a plurality of idler gears, a sun gear coupled to the first end of the first output drive shaft and rotatably coupled with the plurality of idler gears, and a ring gear rotatably coupled with the plurality of idler gears;

a second gear coupled to the first end of the second output drive shaft for rotatably driving the ring gear of the planetary gear set;

an output spindle having a longitudinal axis, the output spindle coupled to the plurality of idler gears for providing a rotational output; and wherein the first longitudinal axis and second longitudinal axis are displaced from the longitudinal axis of the output spindle.

2. The variable-speed, multiple-motor power tool of claim 1, wherein the housing is formed to generally define a pistol-grip shaped housing.

3. The variable-speed, multiple-motor power tool of claim 1, wherein the planetary gear set further comprises a one-way clutch that allows the ring gear to rotate in one direction.

4. The variable-speed, multiple-motor power tool of claim 3, wherein each idler gear of the plurality of idler gears of the planetary gear set has an idler gear pin and a needle bearing so that the idler gear may rotate around the idler gear pin through the needle bearing.

5. The variable-speed, multiple-motor power tool of claim 1, further comprising:
   an intermediate spindle coupled to and driven by the planetary gear set; and
   a second planetary gear set coupled to and driven by the intermediate spindle, and wherein the second planetary gear set drives the output spindle to provide a further gear reduction.

6. A variable-speed, multiple-drive power tool for providing output rotation at a desired speed and torque such that the output may vary over a range from a relative high speed/low torque output condition to a relative low speed/high torque output condition, the power tool comprising:
   a housing having a cavity formed therein;
   a first motor secured within the cavity of the housing;
   a first output drive shaft coupled to the first motor, the first output drive shaft having a first longitudinal axis and having a first end;
   a second motor secured within the cavity of the housing;
   a second output drive shaft coupled to the second motor, the second output drive shaft having a second longitudinal axis and having a first end;
   a planetary gear set having a plurality of idler gears, a sun gear coupled to the first end of the first output drive shaft and rotatably coupled with the plurality of idler gears, and a ring gear rotatably coupled with the plurality of idler gears;
   a second gear coupled to the first end of the second output drive shaft for rotatably driving the ring gear of the planetary gear set, the sun gear and second gear operable to rotate the planetary gear set;
   an output spindle having a longitudinal axis, the output spindle coupled to the plurality of idler gears for providing a rotational output;
   wherein the first longitudinal axis is displaced from the second longitudinal axis; and
   wherein the first longitudinal axis and second longitudinal axis are displaced from the longitudinal axis of the output spindle.

7. The variable-speed, multiple-motor power tool of claim 6, wherein the housing is formed to generally define a pistol-grip shaped housing.

8. The variable-speed, multiple-motor power tool of claim 6, wherein the planetary gear set further comprises a one-way clutch that allows the ring gear to rotate in one direction.

9. The variable-speed, multiple-motor power tool of claim 8, wherein each idler gear of the plurality of idler gears of the planetary gear set has an idler gear pin and a needle bearing so that the idler gear may rotate around the idler gear pin through the needle bearing.

10. The variable-speed, multiple-motor power tool of claim 6, further comprising:
    an intermediate spindle coupled to and driven by the planetary gear set; and
    a second planetary gear set coupled to and driven by the intermediate spindle and wherein the second planetary gear set drives the output spindle to provide a further gear reduction.

11. The variable-speed, multiple-motor power tool of claim 6, wherein the first motor is a low speed rotary vane motor and the second motor is an air turbine motor.

12. The variable-speed, multiple-motor power tool of claim 6, wherein the ring gear is rotatably driven by the second gear, the ring gear and the second gear can be varied to provide a specific gear ratio.

13. A variable-speed, multiple-drive power tool, for providing output rotation at a desired speed and torque such that the output may vary over a range from a relative high speed/low torque output condition to a relative low speed/high torque output condition, the power tool comprising:
    a housing having a cavity formed therein;
    a first motor secured within the cavity of the housing;
    a first output drive shaft coupled to the first motor and the first output drive shaft defining a first longitudinal axis and having a first end;
    a second motor secured within the cavity of the housing;
    a second output drive shaft coupled to the second motor and the second output drive shaft defining a second longitudinal axis and having a first end, the first longitudinal axis of the first output drive shaft and the second longitudinal axis of the second output drive shaft being displaced from one another;
    a first gear coupled to the first end of the first output drive shaft;
    a pinion having a first end and a second end;
    a second gear coupled to the second end of the pinion, the first gear and second gear being rotatably coupled;
    a planetary gear set having a plurality of idler gears, a sun gear coupled to the first end of the pinion and rotatably coupled with the plurality of idler gears, and a ring gear rotatably coupled with the plurality of idler gears;
    a third gear coupled to the first end of the second output drive shaft for rotatably driving the ring gear of the planetary gear set, the pinion and the third gear operable to rotate the planetary gear set;
    an output spindle having a longitudinal axis, the output spindle coupled to the plurality of idler gears for providing a rotational output; and
    wherein the first longitudinal axis and second longitudinal axis are displaced from the longitudinal axis of the output spindle.

14. The variable-speed, multiple-motor power tool of claim 13, wherein the housing is formed to generally define a pistol-grip shaped housing.

15. The variable-speed, multiple-motor power tool of claim 13, wherein the planetary gear set further comprises a one-way clutch that allows the ring gear to rotate in one direction.

16. The variable-speed, multiple-motor power tool of claim 15, wherein each idler gear of the plurality of idler gears of the planetary gear set has an idler gear pin and a needle bearing so that the idler gear may rotate around the idler gear pin through the needle bearing.

17. The variable-speed, multiple-motor power tool of claim 13, further comprising:
    an intermediate spindle coupled to and driven by the planetary gear set; and
    a second planetary gear set coupled to and driven by the intermediate spindle, and wherein the second planetary gear set drives the output spindle to provide a further gear reduction.

18. The variable-speed, multiple-motor power tool of claim 13, wherein the first motor is a rotary vane motor and the second motor is a rotary vane motor.

* * * * *